(No Model.) 4 Sheets—Sheet 1.

G. H. JONES.
MOSAIC WORK.

No. 586,795. Patented July 20, 1897.

WITNESSES:
Frank S. Ober
A. M. Hayes

INVENTOR
George H. Jones
BY
Fowler & Fowler
ATTORNEYS.

(No Model.) 4 Sheets—Sheet 2.

G. H. JONES.
MOSAIC WORK.

No. 586,795. Patented July 20, 1897.

WITNESSES:
Frank S. Ober
A. M. Hayes

INVENTORS.
George H. Jones.
BY
Fowler & Fowler
ATTORNEY (No Model.)  4 Sheets—Sheet 3.

G. H. JONES.
MOSAIC WORK.

No. 586,795.  Patented July 20, 1897.

WITNESSES:
Frank S. Ober
A. M. Hayes

INVENTOR
George H. Jones.
BY
Fowler + Fowler
ATTORNEYS.

(No Model.) 4 Sheets—Sheet 4.

G. H. JONES.
MOSAIC WORK.

No. 586,795. Patented July 20, 1897.

WITNESSES:
Frank S. Ober
A. M. Hayes

INVENTOR
George H. Jones
BY
Fowler & Fowler
ATTORNEYS.

UNITED STATES PATENT OFFICE.

GEORGE H. JONES, OF NEW YORK, N. Y.

MOSAIC WORK.

SPECIFICATION forming part of Letters Patent No. 586,795, dated July 20, 1897.

Application filed March 13, 1896. Serial No. 583,009. (No specimens.)

*To all whom it may concern:*

Be it known that I, GEORGE H. JONES, a citizen of the United States, residing at the city of New York, county and State of New York, have invented certain new and useful Improvements in Mosaic Work, of which the following is such a full, clear, and exact description as will enable any one skilled in the art to which it appertains to make and use the same, reference being had to the accompanying drawings, forming part of this specification.

I have illustrated my invention in the accompanying drawings, wherein—

Figure 1:
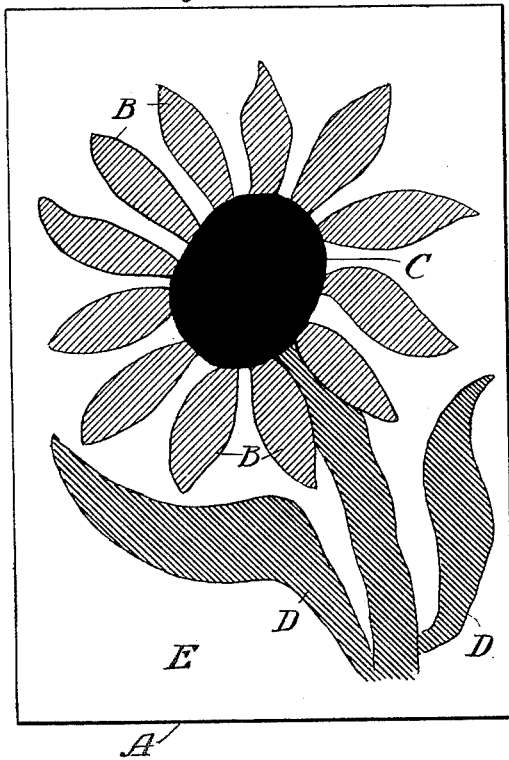
Figure 2:
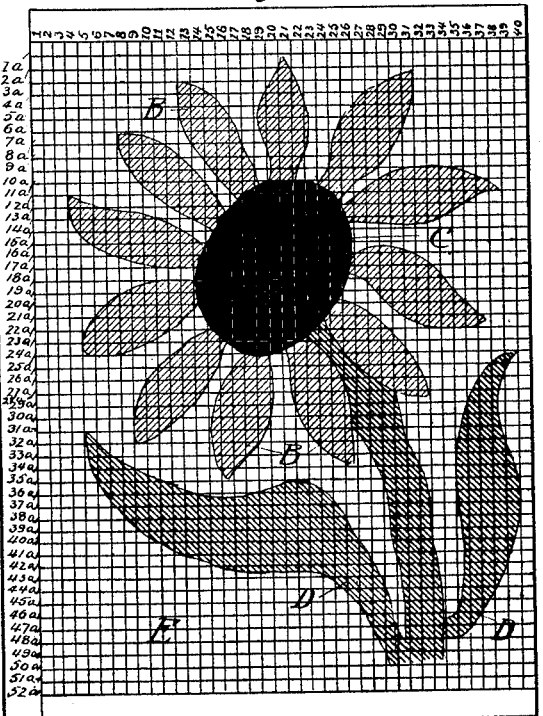
Figure 3:
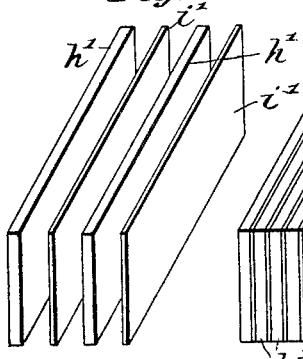
Figure 4:
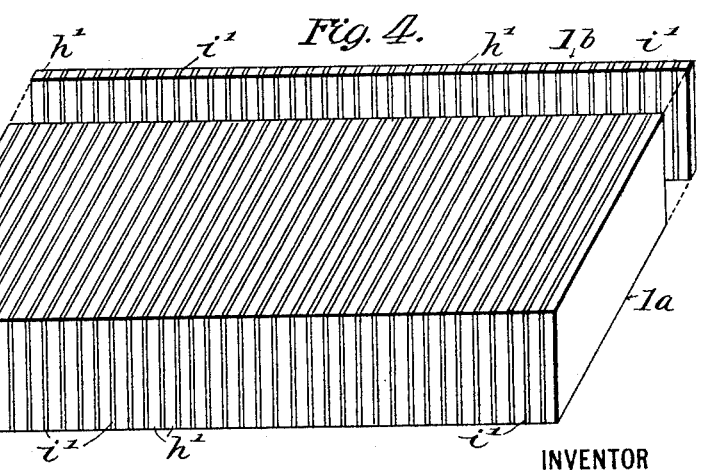
Figure 10:
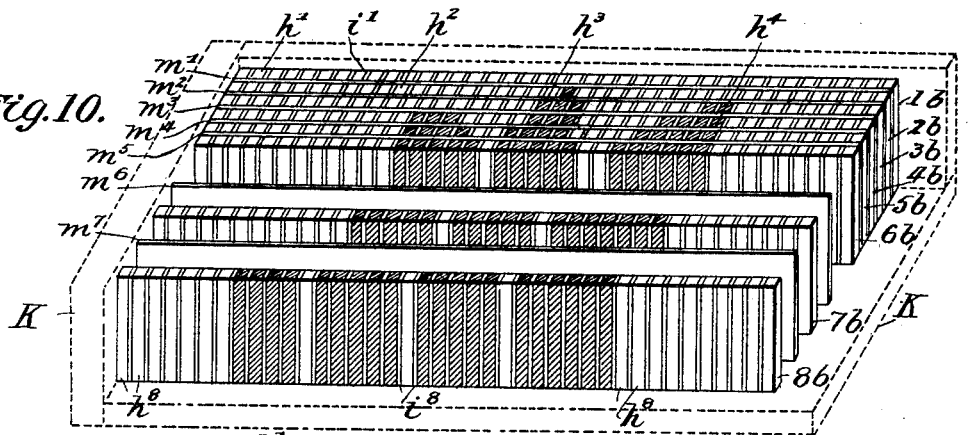
Figure 11:
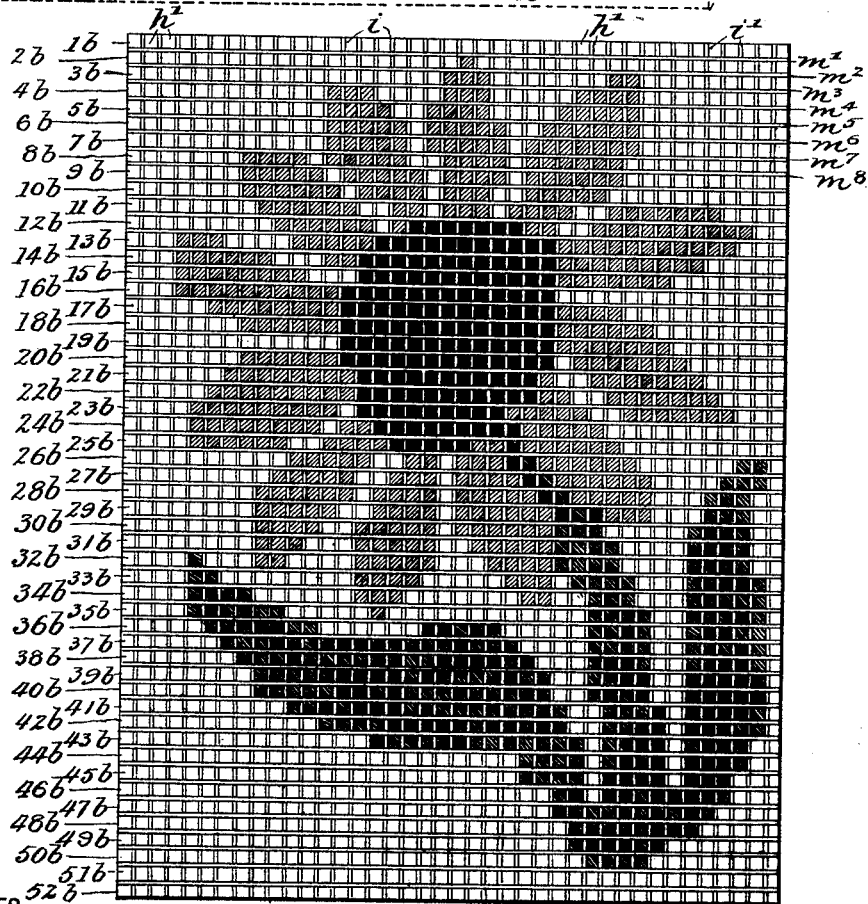
Figure 12:
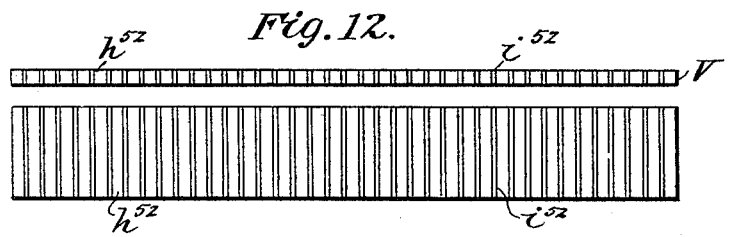
Figure 13:
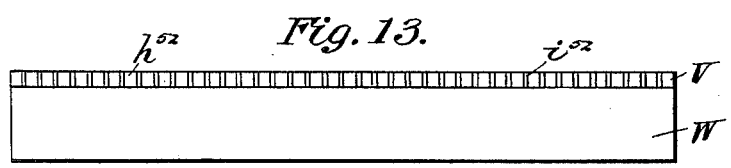
Figure 14:
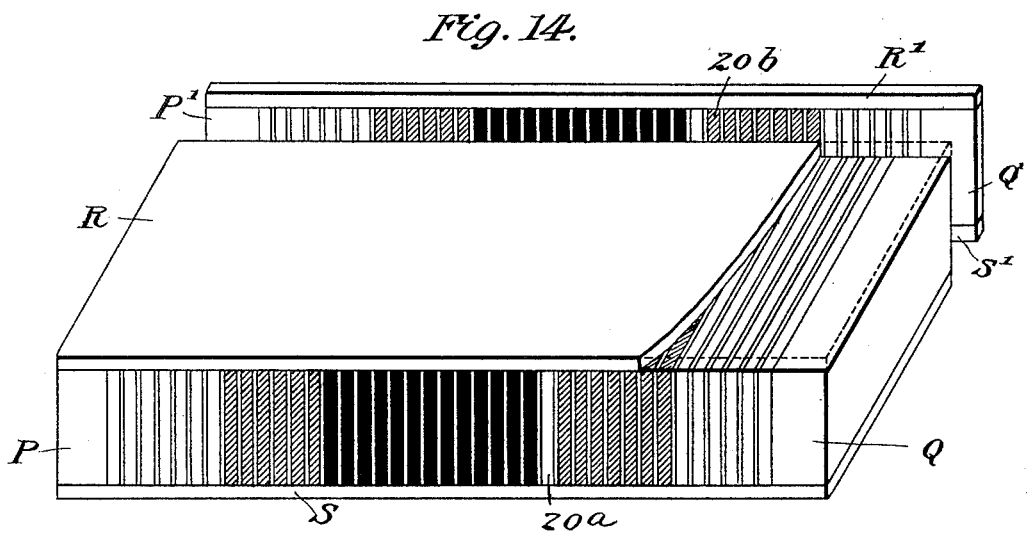
Figure 15:
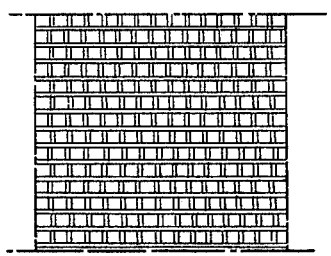
Figure 16:
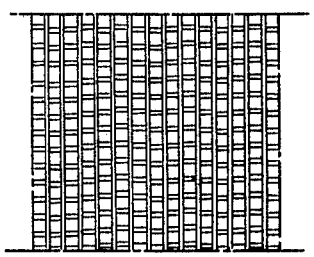
Figure 17:
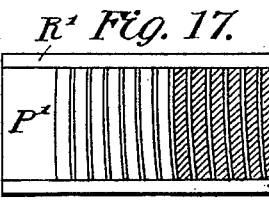

Figure 1 of the drawings shows what I will term a "pattern-card," and which contains the subject or figure that is to be reproduced or built up in mosaic. Fig. 2 shows the pattern-card laid off in sets of parallel lines crossing each other for the purpose of forming rows of spaces or squares thereon to serve as a chart or guide in first building up the so-called "primary" blocks used in my method, and, secondly, as a guide in assembling pieces of such primary blocks to form the final block or mosaic. Fig. 3 is a perspective view of several of the strips or laminæ placed in position to be brought together with their flat sides in contact to form a primary laminated block. Fig. 4 is a perspective view of one of my primary laminated blocks, a slice of this block cut therefrom at an angle to the lamination being shown in perspective just above it. Figs. 5, 6, 7, 8, and 9 show plan views of different orders, respectively, of my primary laminated blocks, each with a slice cut therefrom, as hereinafter described. Fig. 10 shows in perspective a final laminated block (or the mosaic proper) in course of construction, a portion of the block being shown as built up, while several of the pieces which are next to be built into it are shown in position ready to be pushed into place. Fig. 11 is a plan view of a final block or mosaic proper made in accordance with my invention and in which the flower shown in the pattern is reproduced, but it appears upon a slightly-enlarged scale, owing to the introduction of the strips of material metallic pieces, the full width of which does not happen to be allowed for in laying off the pattern in the present case. Fig. 12 shows an edge view of the final block or mosaic, with a thin layer cut therefrom as a veneer; and Fig. 13 shows this mosaic veneer mounted upon a backing or bed-piece of inferior material. Fig. 14 shows in perspective one of my primary laminated blocks, having glued thereto upon the broad sides a binder-sheet and having its broad sides and two of its opposite ends provided with binder-pieces, which are glued thereto for facilitating handling sheets cut from the block, one of said sheets being shown just above the block. Figs. 15 and 16 show portions of my mosaic in which the long lines of metal run horizontally and vertically, respectively. These views also show the short pieces of metal ou- of alinement, as distinguished from the arrangement in Figs. 10 and 11, and which is an effect that in most instances I prefer to bring about. Fig. 17 is a side view of a slice taken from a primary laminated block and shows how the pieces composing the same become slightly disarranged or distorted in actual practice.

Referring to the drawings, in which like marks of reference indicate like parts throughout, A represents what I term a "pattern-card," which bears the figure of an ordinary flower, known as the "sunflower," in which the petals B are yellow, the center C is a dark brown and the stem and leaves D are green, the background E being of any desired color—for instance, white. Upon this sheet or card I lay off a series of equidistant parallel lines extending vertically, and I then lay off another series of similarly-spaced parallel lines crossing the first-mentioned series at an angle, which in the present instance happens to be a right angle. This produces a chart in which the surface of the pattern-card is divided into small squares or tessellations, though of course the lines may be laid off in a different way, thereby producing oblong spaces or diamond-shaped ones, or any other desired form that one may wish to bring out in the mosaic. At the upper end of this chart I place a series of numbers 1 2 3 4, &c., running in consecutive order, so that the number 1 may indicate the vertical row of squares or spaces lying between the first and second vertical lines, the number 2 may indicate the vertical row of spaces lying between the second and third lines, the number 3 the vertical row of spaces lying between the third and fourth lines, and so on across the width of the chart, each number thus indicating a vertical row of spaces. In a similar way I place at one side of the chart a vertical row of numbers $1^a$ $2^a$ $3^a$ $4^a$, &c., so that beginning at the upper end of the chart the mark $1^a$ indicates the horizontal row of spaces lying between the first and second horizontal lines. $2^a$ indicates the horizontal row of spaces lying between the second and third lines, and so on through the series, so that each of the numbers designates a certain row of spaces.

Figure 5:
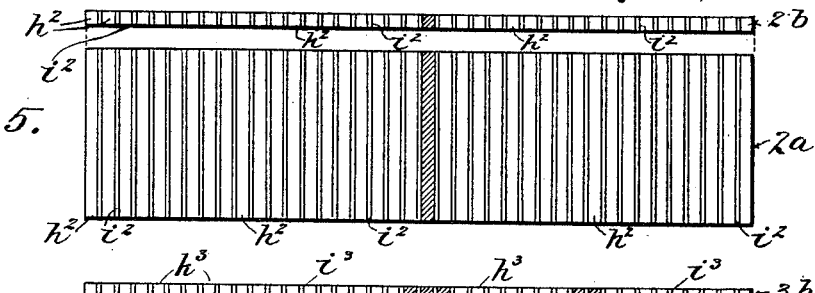
Figure 6:
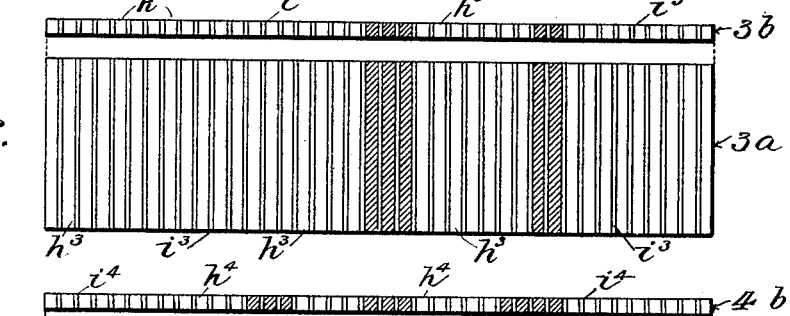
Figure 7:
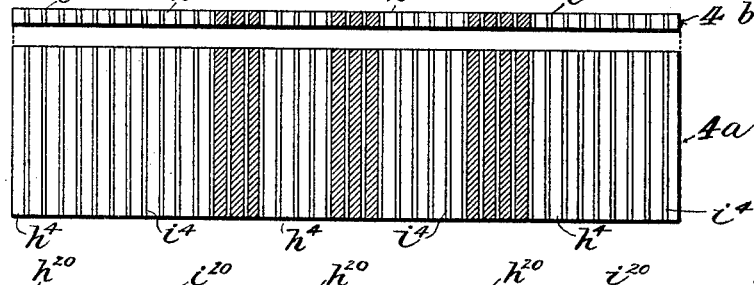
Figure 8:
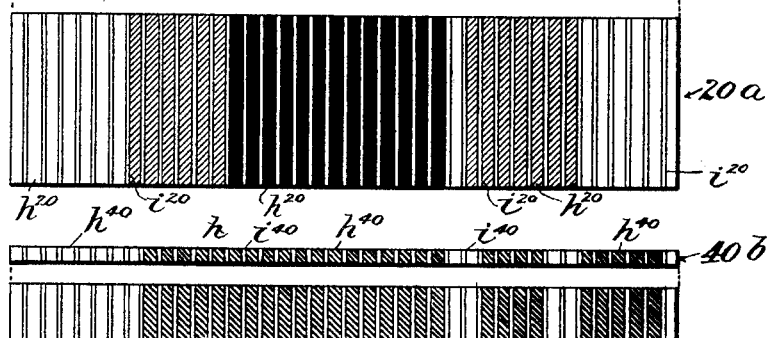
Figure 9:
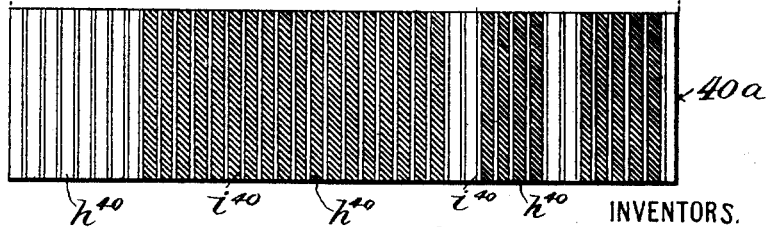

Beginning now with the horizontal row of spaces at the top of the pattern in Fig. 2 and which is designated by the mark $1^a$ and finding that all the spaces in this row, which number forty, are white I build up a primary block by taking forty strips or pieces of white-colored material other than metal—such, for instance, as wood—and place them flatly together with alternate strips or plates of metal placed between adjacent pieces of the wood, so that the wood and metal alternate in arrangement. The separate pieces of wood and metal are shown in Fig. 3, wherein $h'\ h'$ represent flat strips of wood and $i'\ i'$ thin strips of metal, which are comparatively strong or rigid, and which are preferably thinner than the pieces of wood. These strips of wood and metal are put together in the form of a block, as indicated in Fig. 4, the pieces being thoroughly glued together under pressure, so as to make a practically solid laminated block which I will designate as "primary" block $1^a$. I cut or saw this block $1^a$ transversely the laminæ, so as to form a strip or sheet $1^b$ of about the thickness of the strips of wood $h'\ h'$, primarily used in the block, thus producing a strip composed of alternate bars of wood and metal in which the bars of wood are substantially square in cross-section. This strip $1^b$ is then set up as the first piece of the final block or mosaic, as shown in Fig. 10. The second horizontal row of spaces $2^a$ is then followed out in the same way in constructing the second primary block, as shown in Fig. 5, and the alternating layers of white wood $h^2\ h^2$ and metal $i^2\ i^2$ are placed together until a space is reached wherein another color appears. In this second row the first space containing a color different from the white background falls in vertical row 21. The space at this point takes in part of a petal B of the flower and calls for a yellow piece, and accordingly a strip of yellow wood is at this point inserted, and as this is the only space in the second horizontal row calling for a different color from the background the building of the block is then continued with alternate strips of white wood and metal until the block is completed. This block, which is the second primary one, is shown in Fig. 5, and I mark it $2^a$. A strip $2^b$ of a thickness similar to $1^b$ is cut therefrom in the same manner as the latter, and it is set up alongside of said strip $1^b$, (see Fig. 10,) a thin metal strip $m'$ being first placed between the two. This brings the bar of the yellow material in strip $2^b$, which is indicated by parallel diagonal lines in Fig. 5, in the position corresponding to the space of the pattern found in horizontal row $2^a$, column 21. By proceeding in the same manner with the third horizontal row from the top, which is row $3^a$, I build up a third primary laminated block, which is found in Fig. 6 and marked $3^a$. In this block three strips of yellow material $h^3\ h^3$ are inserted near the center, so as to constitute part of the petal of the pattern which falls in columns 20, 21, and 22, and two strips of yellow are used toward the right hand to constitute part of the petal falling in vertical columns 30 and 31. A transverse sheet $3^b$ is then cut from $3^a$, and it is set up alongside of sheet $2^b$, a strip of metal $m^2$ being first interposed. In the same way I construct a fourth primary block, as shown in Fig. 7 and marked $4^a$, from which I cut a strip $4^b$ and set it in place alongside of $3^b$, first interposing a plate of metal $m^3$. These primary blocks are thus built in consecutive order until all the horizontal rows are provided for. It will now be understood that after making these laminated primary blocks, so that one corresponds to each horizontal row $1^a\ 2^a\ 3^a$, &c., and cutting a strip from each and assembling them with alternate layers of metal $m'\ m^2$, &c., as shown in Fig. 10, I obtain the final block or mosaic shown in Fig. 11, the composite strips forming the same being thoroughly glued together to form as solid a body as possible. In this mosaic each of the squares or tesseræ has its corresponding space in the pattern, while the short pieces $i'\ i^2\ i^3\ i^4$, &c., are constituted by a portion cut from the strips of metal primarily used in the laminated block, while the long veins of metal $m'\ m^2$, which run horizontally across the mosaic, are constituted by the long strips, which in building up the final block are alternately inserted with the composite strips cut one each from the primary blocks in consecutive order.

The mosaic thus produced presents a close cellular structure or tessellated effect which is prominently brought out by use of the metallic network of comparatively strong or rigid material which in the type of invention shown completely surrounds or incases each piece of non-metallic material that is used in the mosaic. In connection with this metallic network it will be noted that the long lines of metal $m'\ m^2$, &c., occurring in the mosaic illustrated run horizontally through the same, while the short pieces are vertical; but this arrangement may be reversed and the long lines of metal $m'\ m^2$, &c., may be caused to run vertically and the short veins horizontally. This relative arrangement of the long and short lines of metal is shown in Figs. 15 and 16, respectively.

Another important point in regard to the metallic structure of the type of mosaic shown is found in the fact that while theoretically the short veins of metal should fall in alinement, in practice this is not the case.

In Fig. 17 I have endeavored to give an illustration of the appearance of the alternate pieces of metal and other material as found in the slices cut from the primary blocks and from which it will be seen that the pieces are slightly bowed or curved on their lengths.

I have illustrated in Fig. 14 the manner in which I incase a primary block in the binders. In this figure P and Q represent comparatively thick pieces of wood, which are firmly glued to each of two opposite ends of the primary block, (which happens to be primary block $20^a$,) and after these pieces are put on the solid plates of wood R and S are firmly glued to the broad sides of the block. Now when the sheet $20^b$, which is to go into the mosaic, is cut from this block, as shown just above it in said figure, the same will be surrounded by a comparatively rigid frame R' Q' S' P', and as these sheets are set in place with the binder-frames on them the chances of the short pieces of metal being thrown out of alinement are still further increased. Fig. 14 is the only one in which I have illustrated the manner in which I employ the binder-pieces, although in practice I use them in each instance.

While the peculiar network or arrangement of the metal which I have illustrated and described produces a very characteristic effect upon the eye in breaking or dividing up the surface of the mosaic and imparting thereto something of a honeycomb appearance, the said surface is also given a remarkable metallic sheen or luster, and, further, it possesses a changeable quality and shaded effect like that found in changeable silk, according to the angle at which the light strikes it.

While the drawing in Fig. 11 shows the pieces of metal as very prominent, they may be readily made less so by the use of very thin sheets of metal, whereby the reticulation of the same will appear in very fine hair-like lines. I have produced some wonderful effects by the exclusive use of copper as the metal, likewise of brass, though any desired metal may be used, and, if desired, a combination of metals may be used, so that the short veins or pieces may appear as one kind of metal and the long ones as another kind of metal, or so that a certain feature or part of the subject or design may contain one kind of metal, while other features contain a different one. For example, in the mosaic shown in Fig. 11 all the metallic veins or pieces contained within the center C of the flower may be made of copper, while all the metallic veins or pieces in the petals B may be made of brass. In such case the long lines of metal would not be continuous, as there would be a joint in the same at the point where the two metals had to differ.

It is obvious also that my invention may be carried out by forming the mosaic exclusively of metals, which are contrasted in color or appearance. For instance, a primary block may be built up of strips $h'$ $h'$ of copper with interposed strips $i'$ $i'$ of, say, brass, and then the final block made up with interposed strips $m'$ $m^2$, &c., of the same kind of metal as the strips $i'$ $i'$ of the primary block. In this way there is produced a mosaic made of small blocks or plates of copper surrounded by a fine line of a lighter colored metal, (brass.)

The mosaic produced by my invention is in the form of a solid and comparatively thick block or body, which as a rule I cut into thin layers or slabs and use the same as veneer. In Figs. 12 and 13 I show how this is done. The lower part of Fig. 12 shows an edge view of the thick mosaic block, while the upper part is an edge view of a thin layer V cut from said block parallel with the surface of the mosaic. This slab of veneer V is shown in Fig. 13 as being mounted upon a piece of inferior material W. I have made the thinnest kind of veneer from my mosaic and in some cases have mounted the same upon flexible backing and find that the mosaic even under such conditions is very durable.

In addition to making subject or figured work comprising many colors I also make what I term "plain" mosaic in which the tesseræ are of the same color. For instance, I make plain mahogany mosaic in which brass or copper is used with mahogany and such plain pieces may be used as desired in decorations. The plain mosaic may be itself cut out in figures and inlaid as a unit, and it may in this way be also used in marquetry. By laying off diagonal lines on the pattern instead of normal ones the trend of the lines of metal may be readily made diagonal instead of perpendicular and horizontal, as shown.

This mosaic work of mine will take a very high polish and obviously the metal may be readily brightened by rubbing it up in case it should become tarnished.

Having thus described my invention, what I claim, and desire to secure by Letters Patent, is—

1. Mosaic work presenting a close cellular structure and comprising series of single courses of tesseræ, series of partitions of comparatively strong or rigid material contrasting with the tesseræ, said partitions being severally interposed between the single courses, and disconnected transverse partitions separating the individual members of the single courses of tesseræ from each other; substantially as described.

2. Mosaic work presenting a close cellular structure and comprising series of single courses of tesseræ, series of partitions of comparatively strong or rigid material contrasting with the tesseræ, said partitions being parallel with each other and being severally interposed between the single courses, and disconnected transverse partitions separating the individual members of the single courses of tesseræ from each other; substantially as described.

3. Mosaic work presenting a close cellular structure and comprising series of single courses of tesseræ, series of partitions of comparatively strong or rigid material contrasting with the tesseræ, said partitions being severally interposed between the single courses, and disconnected transverse partitions separating the individual members of the single courses of tesseræ from each other, the transverse partitions of adjacent courses being out of alinement with each other; substantially as described.

4. Mosaic work presenting a close cellular structure and comprising series of single courses of tesseræ $h'$, $h^2$, &c., series of metallic partitions $m'$, $m^2$, &c., contrasting with the tesseræ, said partitions being severally interposed between the single courses, and disconnected transverse metallic partitions $i'$, $i^2$, &c., separating the individual members of the single courses of tesseræ from each other; substantially as described.

In testimony whereof I have hereunto set my hand, this 10th day of March, 1896, in the presence of two subscribing witnesses.

GEORGE H. JONES.

Witnesses:
WILLIS FOWLER,
SAMUEL M. CHESNUT.